3,310,598
DOUBLE-BOND ISOMERIZATION OF OLEFINS USING CHROMIUM PHOSPHATE CATALYST
Charles R. Noddings, Midland, and Ronald G. Gates, Breckenridge, Mich., assignors to The Dow Chemical Company, Midland, Mich., a corporation of Delaware
Filed Jan. 6, 1964, Ser. No. 335,929
2 Claims. (Cl. 260—683.2)

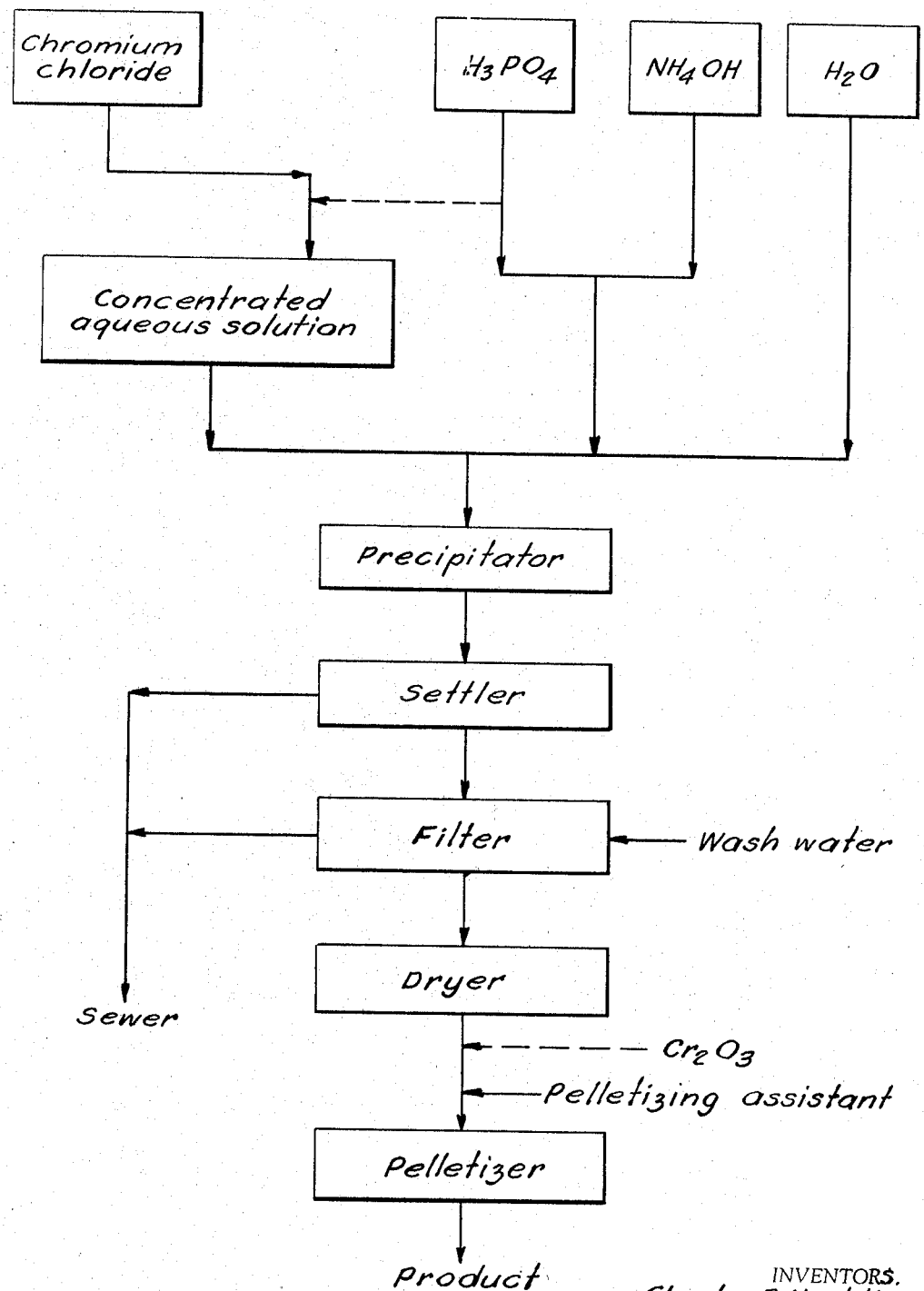

This invention concerns a new catalyst and a process employing the catalyst for the isomerization of $\alpha$-olefins having four or more carbon atoms in the molecule.

It is, of course, well known that aliphatic hydrocarbons, e.g., petroleum fractions (mixed hydrocarbons) or individual paraffins or olefins, can be pyrolyzed to obtain a mixture of products comprising a small, though appreciable, proportion of conjugated diolefins and a larger proportion of shorter chain length unsaturate products. However, it is unusual to find among those metals capable of complex compound formation and which in such form are dehydrogenation and/or cracking catalysts, that one member of such complex is capable of isomerizing 1-olefins to 2-olefins in nearly quantitative yields.

It is an object of this invention to provide an improved method for the isomerization or 1–$C_4$ and higher olefinic hydrocarbons to their 2-position isomers. Another object of the present invention is to provide such a method whereby useful organic products (that is, products other than $CO_2$, carbon and hydrogen) from the isomerization are obtained in quantities which increase the economical value of the products over that of the starting carbon compounds. A further object is to provide a set of operating conditions under which the new catalyst may effectively be used for the foregoing purposes. Other objects will be apparent from the following description of the invention.

We have found that a chromium phosphate prepared under conditions to maintain the pH between about 3.5 and 8.0 will yield a catalytic material which will isomerize 1-alkenes to their corresponding 2-alkenes in near quantitative yields and conversions.

The catalyst is prepared by mixing together a water-soluble metal salt of chromium with a water-soluble form of the ortho-phosphate moiety ($PO_4\equiv$) in an aqueous medium under conditions such that the pH of the complexing environment is within the range of from about 3.5 to about 8.0 and preferably between about 3.9 to 4.8. Further, while not critical, but desirable, the phosphate moiety is employed in a slight excess over that which is theoretically necessary to combine with the metal ion to form a metal orthophosphate. It is to be understood that the pH may, but does not have to, be maintained within the operative range during mixing but can be adjusted, after mixing, by addition of a base or acid as necessary to the reaction mixture to bring the solution within the desired range thereby causing precipitation of a catalytic material.

The contacting and mixing of the reactants in accordance with the above recitation can be carried out in several manners, such as simultaneously, stepwise or intermittently, each in either a batchwise or continuous manner.

Examples of salts which may be used as starting materials in preparing the catalyst are the chlorides, bromides, nitrates, and acetates, etc., of chromium. Examples of soluble phosphates that may be employed as starting materials are disodium phosphate, trisodium phosphate, dipotassium phosphate, di-ammonium phosphate, etc.

The catalyst can also be prepared in either a batchwise manner or a continuous manner by feeding separate streams of an alkali, preferably aqueous ammonia, although other bases can be employed, as well as mixtures of two different bases, and as either a single or as separate streams an aqueous solution of chromium salt, and either a separate or as a part of the aforesaid stream a dissolved ortho-phosphate, into a reaction chamber. The relative rates of flow are adjusted so that the resultant mixture will achieve continuously or upon completion of the mixing a pH between 3.5 and 8.0. It is desirable in a continuous or stepwise operation to retain within the reaction zone a portion of the chromium phosphate which forms and precipitates. This is conveniently achieved by adjusting the outflow of the chromium phosphate precipitated to retain a portion of the flocculent material which settles rapidly to form, as a lower layer of the resultant mixture, an aqueous chromium-phosphate slurry that contains 2% by weight or more, usually from 7.5 to 10%, of the chromium phosphate. The reaction mixture, or preferably the settled lower layer thereof, may be filtered to obtain a filter cake which contains 10% or more, usually about 22% of the chromium phosphate.

In order to obtain a rapid settling chromium phosphate of good catalytic activity, it is important that the two streams of the above-mentioned starting materials flow into admixture with one another, e.g., within a body of the resulting mixture, at relative rates such as to maintain the resultant mixture at a pH value between 3.5 and 8.0. The phosphate precipitated from a mixture of higher pH value which is then adjusted to about 3.5 to 8.0 is of good catalytic activity, but is extremely slow in settling. The phosphate precipitated from a mixture of pH value below 3.5 settles rapidly, but is less active as a catalyst for the isomerization of $C_4$ hydrocarbons than is phosphate precipitated from mixtures within the range of 3.5 to 8.0 pH values. It also appears necessary, in order to obtain a chromium phosphate product of rapid settling rate, that a portion of the precipitated phosphate be retained in the mixing and reaction zone so that, once the process is started, the catalyst is being formed and precipitated in the presence of a slurry of the chromium phosphate. It is probable that the catalyst already precipitated serves as nuclei for precipitation of further amounts of catalytic material and aids in controlling the particle size and physical form of the material undergoing precipitation, but the invention is not restricted to this theory as to a reason for the result obtained. Presence of preformed particles of catalyst during precipitation of further amounts of the latter is not, of itself, sufficient to cause formation of a rapid settling product, i.e., it is also necessary that the reaction mixture as a whole be maintained at an average pH value of between 3.5 and 8.0.

The procedure in bringing the two streams of starting materials together and admixing them also has an influence on the rate of settling of the catalyst which is precipitated. It is desirable that the points of feed to the aqueous mixture in the mixing chamber of the streams of the two starting materials be remote from one another and that the mixture be stirred, or otherwise agitated, during introduction of the starting materials. Usually, inlets for the different kinds of starting materials are separated by a distance of a foot or more. Either starting material may, of course, be introduced through a plurality of inlets. It is probable that these precautions of separating the points of feed of the different starting materials and of agitating the mixture result in actual contact between the starting materials in a zone, or zones, of approximately the pH value which is average for the mixture as a whole, i.e., the procedure just recommended presumably results in formation and coagulation of chromium phosphate in zones which are actually at pH values between 3.5 and 8.0. It will be understood that the minimum distance between points of feed of the different starting materials is dependent in part upon the rates of feed, and that it may be less with low rates of feed than with high rates of feed. An increase in the degree, or efficiency, of stirring of the mixture will also permit a decrease in minimum distance between the points of feed. In actual manufacture of the phosphate, the points of feed of starting materials may advantageously be separated by a distance of 5 feet or more.

Usually water is employed as the solvent for the starting materials, but other ionizing solvents, e.g., aqueous alcohol, may in some instances be used.

In any event after the reaction is complete the precipitate is separated from the liquor by filtration or decantation and is washed with water, decanting or filtering after each washing. The washing should be carried out so as to remove as thoroughly as possible readily soluble compounds from the product, since such impurities have a disturbing and erratic action on the thermal decomposition of hydrocarbons. Of particular attention is the unreacted chloride or byproduct chloride which, if retained in the catalyst, tend to deactivate the latter.

After being washed with water, the product is dried, usually at temperatures between 60° and 150° C. The dried product is a hard gel usually of greenish color. The gel may be crushed or otherwise reduced to granules, or small lumps, and be used directly as an isomerization catalyst. However, it is preferably pulverized, e.g., to a particle size capable of passing a 28-mesh screen, and the powdered product is treated with a lubricant and is pressed into the form of pills, tablets, or granules of size suitable for use as a catalyst, e.g., into the form of tablets of from $\frac{1}{16}$ to $\frac{1}{2}$ inch diameter. The lubricant serves to lubricate the particles during the operation of pressing them into pills and its use permits the formation of pills of greater strength and durability than are otherwise obtained. As the lubricant, we preferably use a substance capable of being removed by vaporization or oxidation from the product, e.g., a substance such as graphite, a vegetable oil, or a hydrocarbon oil, etc.

$C_4$ and higher hydrocarbons can be isomerized in the presence of the catalyst of the present invention at temperatures between 100° and 300° C., and in some instances at temperatures as much as 50° C. above this range. The reaction is advantageously carried out at temperatures between 180°–230° C.

Except for the foregoing limitations, the conditions under which the isomerization reaction is carried out may be varied widely. Also, the method is operable at atmospheric, subatmospheric, or at superatmospheric pressures, provided the hydrocarbon reactant is in vaporized form. In some instances, the yield of isomerized product decreases upon increase of the reaction pressure above atmospheric. However, the ability to operate at an increased pressure is of considerable advantage, since condensation of the reaction products may thereby be facilitated. In general, the proportion of hydrocarbon reacted and also the amount of byproduct formation per pass through the catalyst bed tend to decrease with increase in the rate of vapor flow, and vice versa.

In producing isomerized hydrocarbon products in accordance with the invention, a reaction chamber is charged with the granular catalyst and the lubricant employed is removed from the catalyst. This is usually accomplished by passing an $O_2$-containing gas such as oxygen or air, preferably forming a mixture of about equal volumes of air and steam, through the catalyst bed at a high temperature, e.g., 450° to 750° C. When the lubricant used in preparing the catalyst granules is a substance capable of being vaporized, e.g., a mineral or vegetable oil, the step of treating the catalyst with air may be preceded by one of passing an inert gas or vapor such as steam, nitrogen, or carbon dioxide over the catalyst so as to vaporize at least a portion of the binding agent from the catalyst granules.

After freeing the catalyst of the lubricant, the catalyst bed is swept free of the $O_2$ or air with steam and is heated to the desired reaction temperature, preferably by passing superheated steam through the same. The hydrocarbon reactant, e.g., butylene, amylene, hexylene, heptylene, having at least 4 carbon atoms, is then passed through the catalyst bed at a temperature between 100° and 300° C., and preferably between 180° and 230° C. The usual procedure is to pass the hydrocarbon gas which has been heated to 100° C. or above, i.e., to the desired reaction temperature through the bed of catalyst. However, the heat may be supplied in other ways, e.g., by externally heating the catalyst chamber itself. As hereinbefore mentioned, the rate of vapor flow through the catalyst chamber may be varied widely, but in practice the flow usually corresponds to between 100 and 700 liters of the hydrocarbon (expressed as at 0° C. and 760 millimeters pressure) per liter of catalyst bed per hour.

The vapors issuing from the catalyst chamber are ordinarily passed through heat exchangers and other cooling devices to condense the hydrocarbon products.

During use in the process, the catalyst gradually accumulates a small amount of carbon, or nonvolatile organic material, and loses its activity. Accordingly, flow of the hydrocarbon starting material is periodically interrupted and air, admixed with the steam, is blown through the catalyst bed, e.g., at temperatures between 450° and 700° C., to oxidize and remove the carbonaceous or organic material and thus reactivate the catalyst. Usually several hours are required to carry out this reactivation step. However, if, during compounding of the catalyst into tablet form, an agent having the property of catalyzing the oxidation of carbon is admixed therewith, the time subsequently required for reactivating the catalyst with steam and air may be reduced markedly. For instance, the incorporation of one or two percent by weight of chronic oxide in the catalyst tablets facilitates reactivation of the catalyst. Other agents having the property of catalyzing the burning of carbon are known to the art.

After completing the reactivation step, the catalyst chamber is again swept free of air with steam and the introduction of hydrocarbons is resumed. Usually, reactivation of a catalyst is advisable after several hours of use in the isomerization reaction. In practice, two or more catalyst chambers are preferably employed in a system provided with connections for passing the reaction mixture alternately through different catalyst beds. One catalyst bed is usually employed in the isomerization reaction while another is being heated, reactivated, and cooled in consecutive operations. By operating in this manner, the isomerization reaction may be carried out continuously.

The following example illustrates the present invention, but is not to be construed as limiting:

*Example 1*

In the manner shown in the accompanying drawing, 14 gram moles of chromium chloride as an 11 weight percent aqueous solution thereof was mixed in a vessel with 14.4 gram moles of phosphoric acid as a 75.5 weight percent aqueous solution and the resulting mixture is diluted with water to a total volume of 70 gallons. Upon completion of the addition of the above enumerated chemicals to the vessel reactor, an aqueous 14 weight percent ammonium hydroxide solution was, or had been, added. In some instances, the aqueous ammonium hydroxide was added together with the reactants, in others after addition of all of the reactants, and in still others the phosphoric acid and ammonia were first mixed and then admixed with the other reactant. The reaction mass was continuously stirred and base or acid added to produce and maintain a pH of the system between 3.9 and 4.8. In the specific instance 49.8 gram moles of ammonium hydroxide were required to maintain the pH at 4.3 at the end of 3.9 hours of reaction. The reaction was considered complete when the final pH remained constant. Thereafter the reaction mass was allowed to settle overnight after which the supernatant liquid above the precipitate was drawn off (approx. 39 gallons decanted) and the resulting thick slurry filtered and washed with water. The filtrate was discarded. In the specific instance the slurry was washed by decantation with water 19 times until chloride free, then removed and dried at 100° C. in a rotary drier. The dry powder was recovered to the extent of 89% of the theoretical yield, based on the starting materials used, and was crushed, mixed with 2% by weight of a lubricant grade graphite and expressed into pellets about ¼ inch in diameter and ¼ inch long. The graphite was burned off by treating the pellets with air and steam at about 650° C. for about 6 hours. The resulting catalyst pellets were tested as isomerization catalyst at 200° C. and 100 v./v. hr. (v./v. hr.=volumes of gas per unit volume of catalyst per hour) (S.T.P.) with butene-1. Of the butene-1 fed to the reactor there was obtained a 100% yield of butene-2 during 4 hours of reaction. 76% of the butene-1 fed was converted to butene-2 on a once through basis. Under the 1 atm. pressure condition used, the feed analysis was:

| | Vol. percent |
|---|---|
| Propene | 0.3 |
| Isobutane | 3.3 |
| n-Butane | 9.6 |
| 1-butene | 26.4 |
| Isobutene | [1] 48.2 |
| 2-butene | 11.9 |
| 1,3-butadiene | 0.3 |
| Total | 100.0 |

[1] Approx. 10% of the isobutylene was dimerized.

We claim:
1. The method which comprises isomerizing an α-alkene hydrocarbon having at least 4 carbon atoms by passing the hydrocarbon at a temperature between 100° and 300° C. in contact with a catalyst composed of a chromium phosphate material consisting essentially of phosphate radicals chemically combined with chromium, which metal phosphate material is preparable by mixing a solution of soluble salt of chromium with a solution of a soluble ortho-phosphate and precipitating said chromium phosphate material from the mixture at a pH of between about 3.5 and 8.0.

2. The method of claim 1 which comprises passing hydrocarbon vapors containing butene-1 into contact with said catalyst.

References Cited by the Examiner

UNITED STATES PATENTS

| 1,812,398 | 6/1931 | Galle et al. | 208—114 |
| 2,281,804 | 5/1942 | Ruthruff | 260—683.2 |
| 2,336,600 | 1/1943 | Fawcett | 260—683.2 |
| 2,542,813 | 2/1951 | Heath | 260—680 |

FOREIGN PATENTS 1,056,104  10/1959  Germany.

OTHER REFERENCES

Mellor: Comprehensive Treatise on Inorganic and Theoretical Chemistry, vol. 11, pages 479–82, Longmans, Green and Company, N.Y., 1931.

DELBERT E. GANTZ, *Primary Examiner.*

R. H. SHUBERT, *Assistant Examiner.*